United States Patent Office 3,346,558
Patented Oct. 10, 1967

3,346,558
CONTINUOUS PROCESS FOR PREPARING
POLYOL GLYCOSIDES
Claris Deane Roth, Decatur, Ill., assignor to A. E. Staley Manufacturing Company, Decatur, Ill., a corporation of Delaware
No Drawing. Filed Nov. 19, 1965, Ser. No. 508,825
16 Claims. (Cl. 260—210)

This invention relates to a continuous process of preparing polyol-glycosides which comprises working a composition comprising starch, polyol and acid at elevated temperature and pressure substantially above the autogenous vapor pressure of the composition whereby the composition is converted into a fluid mass of polyol-glycosides and thereafter transferring the material into a zone of reduced temperature and pressure. More particularly, this invention relates to a continuous process of preparing polyol-glycosides which comprises subjecting a composition comprising starch, polyol and acid to intense mechanical working or shearing at a temperature of at least 170° C. and pressure substantially above the autogenous vapor pressure of the composition whereby the composition is converted into polyol-glycosides and after a total time of about 0.25 to 5.0 minutes, transferring the fluid mass into a zone of reduced pressure and temperature.

U.S. Patent 3,165,508 describes a method of preparing a relatively inexpensive polyol-glycoside reaction product suitable for the preparation of polyurethane foams which comprises heating granular starch with polyhydric alcohol at a temperature of about 120° to 140° C. for about 30 minutes to one hour in the presence of a strong acid. The reaction product initially passes through an unstirrable gel state as the polyhydric alcohol solvates or swells the starch before the composition liquefies. While the composition is in the unstirrable gel state, there is a tendency for localized charring of starch, which becomes more of a problem as the size of the reaction mass is increased from laboratory size to plant size. Localized charring increases as the concentration of polyhydric alcohol decreases and/or as the reaction temperature increases.

Dutch specification 64—9,994 describes a similar method of reacting starch with polyhydric alcohol in the presence of an acid. The Dutch specification apparently eliminates the gel state, localized charring implicit in U.S. Patent 3,165,508 by slowly adding the starch to a polyhydric alcohol-acid composition which is maintained at about 100 to 250° C. In this method of operation it is possible to convert the starch to polyol-glycosides without the formation of an unstirrable gel since there is never a sufficient concentration of amylaceous material to form a gel. However, in view of the constantly changing mole ratios of polyol to starch, the reproducibility and uniformity of the reaction product can present a problem. Further, both the processes described in the Dutch specification and the U.S. Patent 3,175,508 are batch reactions.

The object of this invention is to provide a rapid continuous method of converting a composition comprising starch, polyol and acid into polyol-glycosides without the starch composition passing through an unworkable gel state. Other objects will appear hereinafter.

I have now found that it is possible to prepare polyol-glycoside compositions in a continuous process by subjecting a composition comprising starch, polyol and acid to intense mechanical working or shearing at elevated temperature and pressure substantially above the autogenous vapor pressure of the composition whereby the starch composition is converted into polyol-glycosides and thereafter transferring the fluid mass into a zone of reduced temperature and pressure. Unlike the batch process described in U.S. Patent 3,165,508, the starch polyol composition does not pass through an unworkable gel state with its attendant disadvantages.

In somewhat greater detail, the process of my invention comprises mixing together starch, polyhydric alcohol and acid. The starch composition is then subjected to intense mechanical working or shearing in a confining chamber whereby the composition is converted into a fluid mass. The fluid mass is heated to or maintained at a temperature of at least about 170° C. whereby the fluid mass is converted into polyol-glycosides and then discharged into a zone of reduced temperature and pressure. The total time in the reactor can range from about 0.25 to 5.0 minutes. The reactor can be viewed as containing two zones. In the first zone the starch composition is converted into a fluid composition while in the second zone the principal chemical reaction takes place.

Conveniently, this process can be performed in a screw-type plastics extruder. The necessary working or shearing of the starch composition is conveniently carried out in the barrel of the screw-type plastics extruder where the first half of the barrel of the extruder can be viewed as the fluidizing zone while the second half of the barrel of the extruder serves as a heat transfer vessel for the principal reaction of starch with polyhydric alcohol. This piece of apparatus provides sufficient means for continuous, intense mechanical working at elevated temperature and pressure with easy and accurate control of processing conditions.

The starch used in this invention can be any native starch, modified starch, or derivative of starch having a relatively low degree of substitution. Corn starch, tapioca starch, rice starch, waxy maize starch, potato starch, wheat starch, high amylose corn starch and the amylose and amylopectin fractions therefrom are representative of the various native starch varieties and starch fractions that may be used in this invention. Any of these starch varieties may be modified, as by enzyme treatment, by oxidation with alkaline hypochlorite, or by treatment with an acid. Starch derivatives, such as starch acetates, carboxymethyl starch, carboxyethyl starch, methyl starch, hydroxyethyl starch, hydroxypropyl starch, etc., can also be used. The starch can be in its original granular form or in a pre-pasted form such as that resulting from extrusion pasting of starch or roll drying of starch. In general the granular native starches, particularly corn starch, are preferred because of their low cost and availability.

The starch can be and preferably is pre-dried to a moisture content of about 0.5 to 5.0% by weight. Starch containing the normal moisture content (up to about 14% by weight water) is not as useful since the water tends to make it difficult to maintain the reactor at the most desirable temperatures of about 200 to 280° C. Excess water tends to suppress the reaction temperature. On the other hand, it has been found that almost completely dry starch (i.e., those containing less than about 0.5% moisture) cannot be converted as readily to polyol-glycoside under the conditions of my invention.

Suitable polyhydric alcohols which can be used in my invention include dihydric alcohols such as ethylene glycol, 1,2-propylene glycol, diethylene glycol, triethylene glycol, tetraethylene glycol, hexylene glycol, diethanolamine, etc.; trihydric alcohols such as glycerol, 1,1,1-trimethylolpropane; 1,1,1-trimethylolethane, 1,2,6-hexanetriol, etc., higher alcohols such as pentaerythritol, sorbitol, etc. These polyols contain from 2 to 6 hydroxyl groups.

In general the polyhydric alcohol or alcohols can be used in a concentration of about 0.20 to 8.0 equivalents of polyhydric alcohol per each gram mole of starch (e.g. 162 grams of unmodified starch). The number of equivalents will vary depending on the polyhydric alcohol. For example, liquid dihydric alcohols (glycols) can be used in a concentration of 0.10 to 2.0 moles per mole of starch. However, it is generally preferred to use approximately 0.15 to 1.0 mole of dihydric alcohol per mole of starch with the range of 0.15 to 0.5 mole of dihydric alcohol per mole of starch being best. When less than 0.30 equivalent of polyhydric alcohol is employed per mole of starch, the composition is relatively difficult to work particularly in the preferred apparatus (conventional screw-type plastics extruder) since the composition is not sufficiently thermoplastic to be advanced readily in the extruder barrel. By this it is meant that the work necessary to convey the starch composition through the extruder is unduly high. When more than 2.00 equivalents of polyhydric alcohol per mole of starch (1.00 moles of dihydric alcohol per mole of starch) is employed, the final reaction product contains a relatively high proportion of unreacted polyol which merely increases the cost of producing the final product without any compensating advantages. In some cases it is necessary to remove this excess polyhydric alcohol from the reaction mass. Within the range of 0.20 to 2.0 equivalents of polyhydric alcohol per mole of starch approximately 40 to 80% of the polyol is chemically combined as polyol-glycoside. When more than about 4 equivalents of a liquid polyhydric alcohol is employed per mole of starch, the composition tends to be too fluid when being worked, and accordingly, it is difficult to advance the starch composition in the preferred screw-type plastics extruder. Of course, solid polyols such as sorbitol do not present this problem.

Suitable catalysts for use in my invention include sulfonic acids such as o, m, p-toluene sulfonic acid, benzene sulfonic acid, o, m, p-bromobenzene sulfonic acid, ethane sulfonic acid, etc., Lewis acids such as $BF_3$, $AlCl_3$, $TiCl_4$, etc. Strong mineral acids such as sulfuric acid, hydrochloric acid, etc. can be employed. However, the mineral acids have a tendency to pit the apparatus in which the reaction is being carried out and yield polyol-glycosides of somewhat darker color than the sulfonic acids and Lewis acids. The preferred catalysts for use in my invention are boron trifluoride ether complexes and the sulfonic acids, which are quite effective in the temperature range of 170° to 300° C. and have essentially no deleterious effect on the apparatus or on the starch composition being worked. The catalyst can be used in a concentration of about 0.0005 to 0.05 mole per mole of starch. The preferred catalyst concentration which affords maximum chemical conversion with minimum side reactions is in the range of about 0.001 to 0.01 mole per mole of starch. The sulfonic acids are preferably used in a concentration of about 0.002 to 0.01 mole per mole of starch, while boron trifluoride is preferably used in the range of about 0.004 to 0.01 mole per mole of starch.

As indicated above, the starch, polyhydric alcohol and acid are mixed together. The starch can be dried prior to mixing with polyhydric alcohol or the mixture dried. The composition can be added immediately after mixing to the reactor or stored. If used immediately after mixing, the composition may have a slightly damp feel. Normally, the composition will be superficially dry and free-flowing, particularly when the preferred concentration of reactants is employed and the composition is allowed to stand for a few hours after mixing. Whether aged or not, the composition can be fed to the reactor with little or no trouble. The starch composition is subjected to intense mechanical working or shearing whereby the starch composition is converted into an essentially homogeneous fluid mass after first passing through a gel state, which is produced as the polyhydric alcohol solvates the starch. The starch is solvated at a temperature of about 100 to 250° C. As indicated above, this can be considered the first zone of the reactor. The fluid mass is conveyed from the indicated first zone to a second zone and heated therein at about 170° to 300° C. (preferentially 200° to 300° C.) whereby said starch composition is converted into polyol-glycoside.

The higher the reaction temperature in the second zone, the more complete the conversion of the starch composition to polyol-glycosides. When the second zone is below about 170° C. there is relatively little conversion of starch to polyol-glycosides under normal operating conditions which entails the starch composition being maintained in the reactor for approximately 0.25 to 5.0 minutes. Much more complete conversion is obtained when the second zone is maintained at about 200° to 300° C. The composition is discharged from the second zone into a zone of reduced temperature and pressure, preferably through a die. The composition as it passes through the die opening is normally liquid and solidifies on cooling. With suitable choice of die (spinnerette die), it is possible to discharge a fluid composition which solidifies into essentially spherical free-flowing balls. These free-flowing spheres can be handled readily and there is little or no tendency to adhere to each other.

As pointed out above, the preferred apparatus for carrying out this invention is a conventional screw-type plastics extruder. The extruder has a long barrel or cylinder of uniform bore which carries a snugly fitting screw. The barrel wall is constructed of material to withstand internal pressure as high as 20,000 p.s.i. and it is firmly attached to a heavy base. The screw is rotated by a motor through an appropriate reducing gear. The ratio of screw length to diameter usually exceeds 6 to 1 and ratios as high as 36 to 1 may be employed. Preferred ratios are those lying within the range of 12:1 to 24:1. The barrel wall contains an opening near one end through which the reaction mixture of starch, polyhydric alcohol and acid is fed to the screw. The reaction mixture may be fed to the extruder under slight pressure obtained by a conventional screw feeder equipped with a hopper, a worm or screw, which is joined to the extruder opening. When the extruder screw is turned in the proper direction, the continuous rib of the screw moves the reaction mixture along the barrel away from the opening. The barrel is equipped with separately controlled electric heating mantles or steam heads and in larger units the screw may be hollow and arranged for internal heating or cooling. The combination of heat, pressure and shearing or working converts the initially superficially dry reaction mixture into a gel and then into a fluid mass. The mass is thoroughly mixed and masticated as it is forced along the barrel by the rotating screw. The extent of reaction at any point in the reactor can be ascertained by removing the screw from the reactor and observing the extent of reaction at each point of the screw. Typically, the first two or three flights of the screw will contain dry amylaceous material. The next flight will contain starch gel with the remainder of the reactor containing the homogeneous fluid mass which is preferentially maintained over most of its length at a temperature in excess of about 170° C. Owing to the preferred design of the screw, in which the rib height decreases toward the discharge end of the extruder, the reaction mixture is subject to increasing pressure as it moves along the barrel and is thus compacted or compressed. The discharge end is equipped with a head gate and a die. Water and polyhydric alcohol in the reaction mixture remain liquid even though the temperature in the reactor is well above their normal boiling point because of the high pressure developed by the screw. The head gate consists of two heavily hinged plates enclosing a perforated breaker plate. The die shapes the fluid reaction mixture as it leaves the extruder and also serves to restrict the flow of polyol-glycoside enough to keep the pressure at the die above the vapor pressure of the mixture. It has been found that dies designed to extrude filaments (spinnerette dies) can be employed in order to obtain spherically shaped extrudates which solidify as they are discharged into the atmosphere.

While the above description has been directed principally toward the use of a screw-type plastics extruder as the apparatus to be used in this invention, various other types of apparatus can be used such as a Marco continuous disc reactor.

The polyol-glycosides prepared by the process of my invention are particularly suitable for the preparation of polyurethane foams. In this use the extrudate, which preferably contains a relatively low concentration of unreacted polyol, is reacted with an alkylene oxide such as propylene oxide, and then reacted with polyisocyanate under typical foaming conditions. The polyol-glycosides can also be employed for the preparation of alkyd resins, or used as extenders in hot melt adhesives or reacted with long chain fatty materials such as stearic acid or alkylene oxides to form emulsifiers or surfactants.

The following examples are merely illustrative and should not be construed as limiting the scope of my invention.

*Example I*

One thousand seventy-six grams (dry solids basis) granular corn starch containing approximately 3.5% by weight water, 102.5 grams ethylene glycol (0.25 mole per mole of starch) and 2.76 grams p-toluene sulfonic acid (0.0022 per mole of starch) were blended together in a Hobart blender to yield a composition containing 2.7 weight percent water. The blend was aged forming a superficially dry powder which was fed continuously under slight pressure to a conventional screw-type plastics extruder (Model #5012, manufactured by National Rubber Machinery Company). The screw was 12 inches long, 1 inch in diameter and had a compression ratio of 1.56:1. The end of the extruder barrel to which the starch composition was fed was heated to a temperature range of 180° to 200° C., while the remainder of the extruder barrel was maintained at a temperature of 230° to 270° C. The screw speed was maintained at 60 r.p.m. and extruded through a 1-hole, 1/32 inch diameter spinnerette die. The composition extruded through the die opening was in the form of small, spherical balls which solidified on exposure to the air at ambient temperature.

The product formed in this manner had the following analytical values:

Hydroxyl number, mg. KOH/g. _____ 1066
Water content, weight percent _____ 1.1
Unreacted glycol, weight percent _____ 4.7

The main components of the glycol-glycosides extrudate were: 1-O-hydroxyethyl glucoside, ethylene bis-glucoside, 1-O-hydroxyethyl oligosaccharide (with from about 2 to 15 anhydroglucose units on the average in the saccharide unit), dextrose, other reducing oligosaccharides and unreacted glycol. The light yellow spheres had a diameter range of from 0.1 to 2.0 mm. and were quite hard and readily shattered. On heating to 110° to 170° C. they became a thick, solid mass which became less viscous as the temperature was increased.

*Examples II to XVII*

The technique described in Example I was repeated with the variations set forth below in Table 1. When more than a one-hole spinnerette die was used, the composition was extruded out onto an aluminum surface on which the extrudate solidified.

TABLE 1

| Example | Blend Composition | | | Extruder Settings | | | Composition of Extrudate | | |
|---|---|---|---|---|---|---|---|---|---|
| | Moles Ethylene Glycol per mole of Starch | Moles Catalyst per mole of Starch* | | Moisture, Wt. Percent | Temperature Zone 1/Zone 2, °C. | Screw Speed, r.p.m. | Number of 1/32" dia. Spinnerette Die holes | Moisture, Wt. Percent * | Wt. Percent of Glycol Chemically Combined | Moles of Reacted Glycol per mole of Starch |
| II | 0.95 | .011 | pTSA | 3.5 | 160/180 | 60 | 6 | 3.0 | 62 | 0.59 |
| III | 0.60 | .003 | pTSA | 3.2 | 200/200 | 85 | 6 | 1.4 | 60 | 0.36 |
| IV | 0.55 | .0025 | pTSA | 2.9 | 190/200 | 40 | 6 | N.A. | 66 | 0.36 |
| V | 0.55 | .005 | BF₃ | 2.2 | 200/215 | 40 | 6 | 0.7 | 64 | 0.36 |
| VI | 0.55 | .002 | pTSA | 3.2 | 210/220 | 40 | 6 | 0.5 | 68 | 0.38 |
| VII | 0.50 | .005 | BF₃ | 2.1 | 200/200 | 85 | 6 | 1.4 | 49 | 0.24 |
| VIII | 0.50 | .0075 | BF₃ | 3.4 | 195/200 | 85 | 6 | N.A. | 61 | 0.30 |
| IX | 0.45 | .0025 | pTSA | 3.1 | 200/225 | 80 | 6 | 0.9 | 55 | 0.25 |
| X | 0.45 | .006 | BF₃ | 3.2 | 200/225 | 80 | 6 | 0.5 | 64 | 0.29 |
| XI | 0.40 | .0022 | pTSA | 2.9 | 200/230 | 40 | 6 | 0.5 | 57 | 0.23 |
| XII | 0.35 | .0022 | pTSA | 3.0 | 200/230 | 60 | 6 | 0.5 | 59 | 0.20 |
| XIII | 0.25 | .0022 | pTSA | 3.1 | 195/230 | 60 | 6 | N.A. | 62 | 0.15 |
| XIV | 0.25 | .0022 | pTSA | 3.5 | 190/230 | 40 | 3 | 0.9 | 61 | 0.15 |
| XV | 0.25 | .0022 | pTSA | 1.8 | 195/245 | 80 | 1 | 0.7 | 58 | 0.15 |
| XVI | 0.20 | .0022 | pTSA | 1.5 | 200/245 | 80 | 1 | 0.8 | 54 | 0.11 |
| XVII | 0.15 | .0022 | pTSA | 3.6 | 195/230 | 40 | 6 | N.A. | 44 | 0.07 |

*pTSA stands for para-toluene sulfonic acid, N.A. stands for not analyzed and BF₃ stands for BF₃ ethyl ether complex.

*Example XVIII*

This example illustrates the use of sorbitol. To 449 grams corn starch (1/2% by weight water) was added 102.5 grams sorbitol (0.20 mole of sorbitol per mole of starch), and 1.16 grams para-toluene sulfonic acid (0.0022 mole per mole of starch), which was dissolved in 100 grams water. The composition was stirred and then dried overnight at 70° C. The composition, which contained approximately 0.5% by weight water, was extruded at 80 r.p.m. by the method described in Example I using a one-hole spinnerette and Zone 1/Zone 2 temperatures of 200/245° C. in the form of light tan spheres having physical properties much like the product prepared in Example I.

*Example XIX*

This example illustrates the use of glycerol. The method described in Example I was repeated using 0.25 mole of glycerol per mole of starch, 0.005 mole boron trifluoride ethyl ether complex, Zone 1/Zone 2 extrusion temperatures of 205/270° C. to form light tan spheres. The final product contains 3.1% by weight unreacted glycerol or in other words 75% by weight of the glycerol was chemically combined.

*Example XX*

Example XIX was repeated with essentially the same results, except that the concentration of glycerol was increased to 0.5 mole per mole of starch and the Zone 1/Zone 2 extrusion temperature was maintained at 205/240° C. The final reaction product contained 10.5% by weight unreacted glycerol or in other words 52% by weight of the glycerol was chemically combined.

Since many embodiments of this invention may be made and since many changes may be made in the embodiments described, the foregoing is to be construed as illustrative only and my invention is defined by the claims appended hereafter.

I claim:
1. A continuous process of preparing polyol-glycosides which comprises subjecting a superficially dry composition comprising starch, polyol and acid to intense mechanical working or shearing in the barrel of an extruder at a temperature and pressure substantially above the autogenous vapor pressure of the composition, whereby the composition is converted into polyol-glycosides and continuously recovering said polyol-glycosides.

2. The method of claim 1 wherein the fluid mass is heated to about 170–300° C.

3. The method of claim 1 wherein said polyhydric alcohol is present in a concentration of 0.2 to 8 equivalents per mole of starch.

4. The method of claim 1 wherein said acid is selected from the group consisting of toluene sulfonic acid and boron trifluoride complex.

5. The method of claim 1 wherein said starch comprises granular starch.

6. The method of claim 1 wherein said polyol-glycosides are recovered by extruding said polyol-glycosides through a spinnerette die.

7. A continuous process of preparing polyol-glycosides which comprises subjecting a superficially dry composition comprising starch, polyol and acid to intense mechanical working or shearing in the barrel of an extruder at a temperature of at least 170° C. and pressure substantially above the autogenous vapor pressure of the composition, whereby the composition is converted into polyol-glycosides and continuously recovering said polyol-glycosides.

8. The method of claim 7 wherein said starch composition contains from about 0.1 to 1.0 mole dihydric alcohol per mole of starch.

9. The method of claim 8 wherein said starch comprises granular starch.

10. The method of claim 8 wherein the water content of said starch-polyol composition is in the range of 0.5 to 5.0% by weight.

11. The method of claim 7 wherein said polyhydric alcohol comprises ethylene glycol.

12. The method of claim 7 wherein said polyhydric alcohol comprises glycerol.

13. The method of claim 7 wherein said polyhydric alcohol comprises sorbitol.

14. The method of claim 7 wherein said acid comprises a Lewis acid.

15. The method of claim 7 wherein said acid comprises a sulfonic acid.

16. The method of claim 7 wherein said composition is extruded through a spinnerette die in the form of spheres.

References Cited

UNITED STATES PATENTS

| | | | |
|---|---|---|---|
| 2,351,625 | 6/1944 | Miescher et al. | 260—210 |
| 2,390,507 | 12/1945 | Cantor | 260—210 |
| 2,407,002 | 9/1946 | Griffin | 260—210 |
| 3,165,508 | 1/1965 | Otey et al. | 260—210 |

LEWIS GOTTS, *Primary Examiner.*

E. L. ROBERTS, *Examiner.*

J. R. BROWN, *Assistant Examiner.*